United States Patent
Davey

[15] 3,668,444
[45] June 6, 1972

[54] LINEAR MOTORS WITH COOLING MEANS

[72] Inventor: Anthony Walter Davey, Hathern, England
[73] Assignee: Herbert Morris Limited, Loughborough, County of Leicester, England
[22] Filed: Mar. 1, 1971
[21] Appl. No.: 119,660

[52] U.S. Cl. .................................................310/13, 310/65
[51] Int. Cl. .................................................H02k 41/02
[58] Field of Search ........................................310/12–14, 64, 310/65, 219, 215, 16

[56] References Cited
UNITED STATES PATENTS

3,602,745  8/1971  Davis...........................................310/13

*Primary Examiner*—D. F. Duggan
*Attorney*—Norris & Bateman

[57] ABSTRACT

A linear induction motor in which the stationary member is formed with coil windings housed in slots between lamination packs mounted in a frame and having fingers or inserts introduced into the winding slots, the fingers or inserts extending over the edges of the lamination packs and being clamped to the motor frame.

6 Claims, 5 Drawing Figures

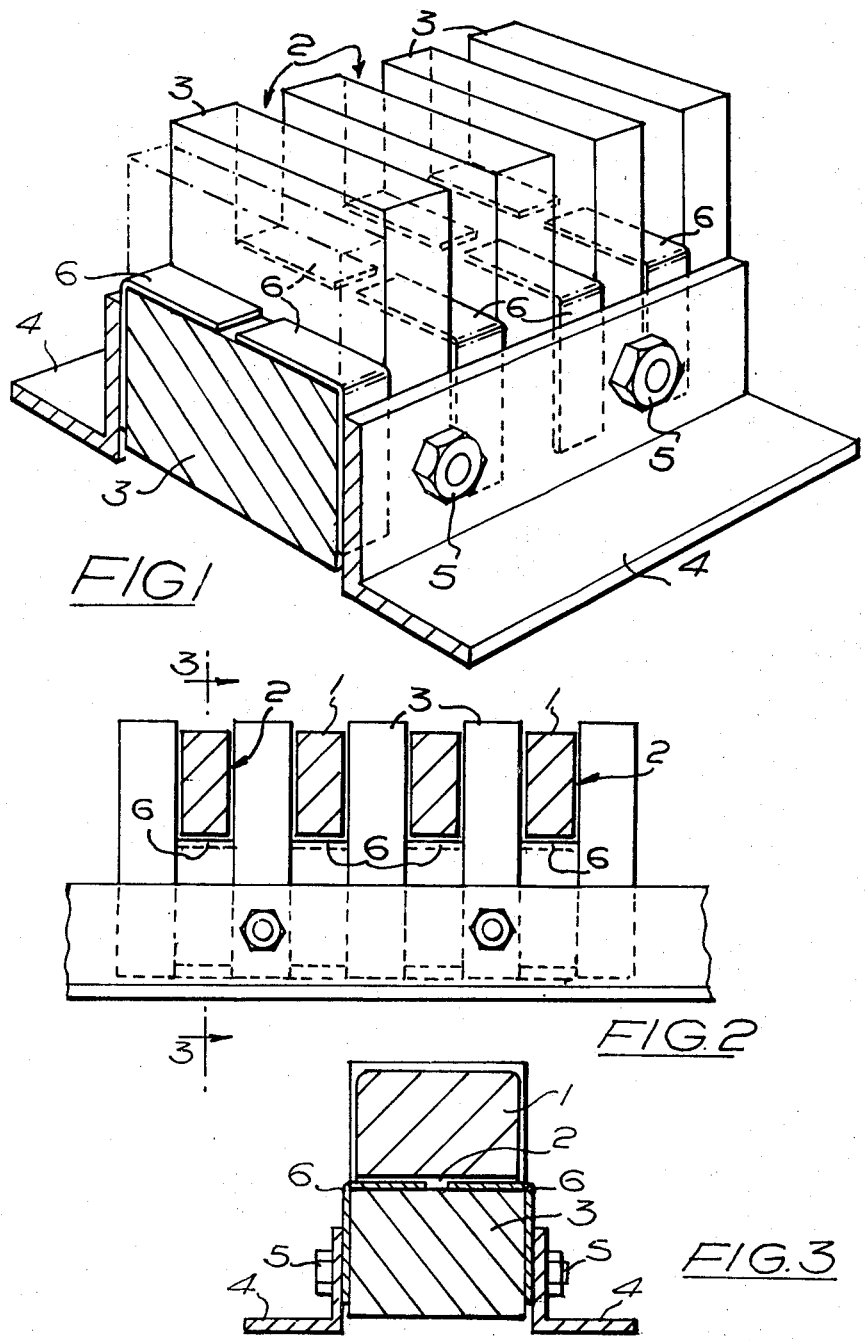

inventor.
ANTHONY WALTER DAVEY
by, Norris & Bateman
NORRIS & BATEMAN

LINEAR MOTORS WITH COOLING MEANS

This invention relates to improvements in linear motors.

The power output of a linear motor is limited by the temperature rise within the motor windings and this is further aggravated when the motor is encapsulated to give mechanical protection since the encapsulant for electrical insulation reasons is a poor thermal conductor.

The object of the invention is to improve the output power by providing thermal extraction paths from the motor.

According to the invention thermal extraction paths in the form of fingers or inserts of good heat conducting material are introduced into winding slots in the motor, the fingers or inserts extending over the edges of the lamination packs and being clamped to the motor frame or mounting clamps to transfer heat generated in the winding therefrom.

The invention will be described with reference to the accompanying drawings:

FIG. 1 is a perspective view of the stationary member of a linear motor unit with the coil windings omitted for clearness showing the invention applied thereto;

FIG. 2 is a side elevation of same;

FIG. 3 is a section on line 3—3 FIG. 2;

Figure 4:
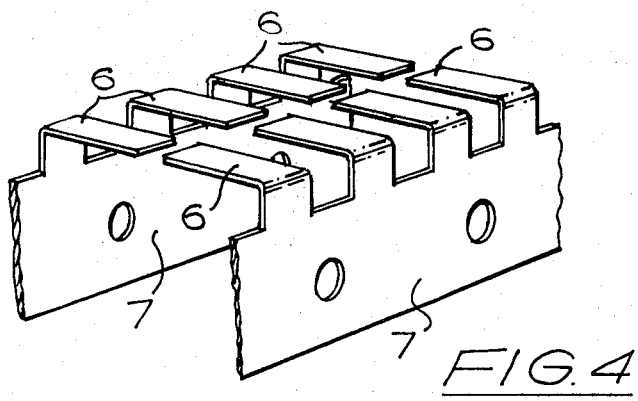
FIGS. 4 and 5 are perspective views of further constructions of inserts.

The stationary member of a linear motor unit is formed with coils 1 in motor winding slots 2 between packs of laminations 3, the coils and laminations being secured in position between angle members forming motor clamps 4 by bolts 5. The ends of the coils 1 in FIG. 3 are shown terminating at the ends of the lamination packs 3 but may extend outwards over the clamps 4.

Low thermal resistance fingers or inserts 6 (FIG. 3) of good thermal conducting material such as aluminum, copper or other metal are inserted into the motor winding slots 2 from each side to extend substantially the width of the slots. A space may be provided between the ends of the fingers or inserts in each slot.

The fingers or inserts 6 are bent for example at 90° on leaving the slots 2, as shown in FIG. 1, at the edge of the lamination pack 3 and are clamped to the edge of the lamination pack by the motor clamps (which are also made from material of low thermal resistance) by the clamping bolts 5 or rivets.

In this manner the heat generated by the windings 1 within the slots 2 is transferred from within the slots through the fingers or inserts 6 into the clamps 4 or to the motor frame.

The linear motor may be mounted on a substantial heatsink or cooling fin arrangement to dissipate the heat and thus cool the motor.

The windings 1 of the linear motor are not impaired in any way as compared with a linear motor without the fingers or inserts 6.

The fingers or inserts 6 may be a number of individual elements or in one piece similar to a comb for convenience in manufacture as shown in FIG. 4 in which they are found integrally with side members 7 through which the bolts 5 pass.

Figure 5:
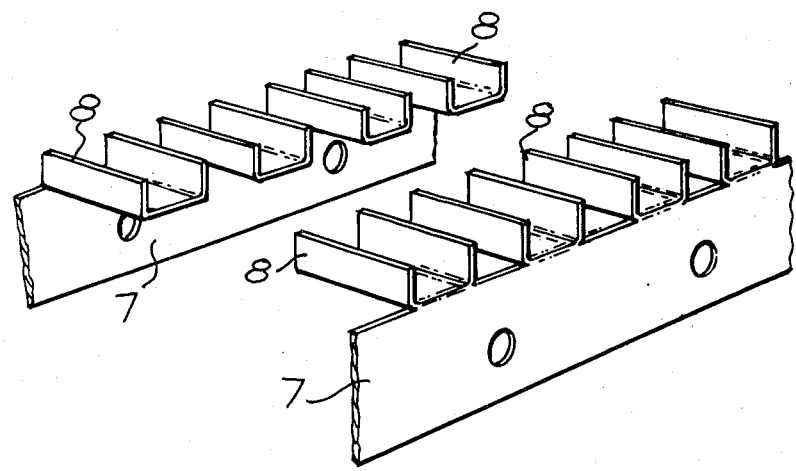

In a further alternative as shown in FIG. 5 the inserts are formed as channel members 8 introduced into the bottom of the slots 2. The sides of the channels may taper from the base to the top due to the press tool design to increase the area in contact with the coils 1 and to increase the height above one half the distance between the channels to enable a maximum heat collection to take place.

On a linear motor with a large build up of laminations 3 the stock may be split to add extra fingers or inserts and clamps 4 to shorten the thermal conduction path.

What I claim is:

1. A linear induction motor having a stationary member with coil windings and lamination packs inserted in a frame, with the coil windings housed in slots between the lamination packs; the invention comprising inserts forming thermal extraction paths introduced into the winding slots in the motor, the outer ends of the inserts extending over the edges of the lamination packs and clamps by which the lamination packs are clamped to the motor frame, to transfer heat generated in the coil windings.

2. A linear induction motor as in claim 1 in which the inserts extend into the motor winding slots from each side and downward at the edges of the lamination packs and clamped thereto.

3. A linear induction motor as in claim 2 in which the inserts are formed integrally with side members held in position by the clamps.

4. A linear induction motor as in claim 2 in which the inserts are formed as channel members integral with side members held in position by the clamps.

5. In a linear induction motor, a stationary member comprising a plurality of lamination packs having coil winding slots between them, motor clamp means secured to said packs, and heat conducting metal inserts extending from said clamp means into said slots adjacent the windings, said inserts projecting a major distance within said slots and serving to transfer heat generated in the windings to said clamp means.

6. In the linear induction motor defined in claim 5, said inserts comprising fingers extending along the bottoms of said slots and downturned integral side members rigidly secured to said packs and said clamp means.

* * * * *